(12) United States Patent
Kaplan et al.

(10) Patent No.: US 7,504,952 B2
(45) Date of Patent: Mar. 17, 2009

(54) WIDE BAND RFID SYSTEM WITH TAG ON FLEXIBLE LABEL

(75) Inventors: Gideon Kaplan, Kiryat Ono (IL); Dan Raphaeli, Kfar Saba (IL)

(73) Assignee: Sandlinks Ltd., Tel Aviv (IL)

( * ) Notice: Subject to any disclaimer, the term of this patent is extended or adjusted under 35 U.S.C. 154(b) by 391 days.

(21) Appl. No.: 11/318,472

(22) Filed: Dec. 28, 2005

(65) Prior Publication Data
US 2007/0152833 A1 Jul. 5, 2007

(51) Int. Cl.
*G08B 13/14* (2006.01)
(52) U.S. Cl. .............. 340/572.7; 340/10.4; 340/572.8; 340/693.3
(58) Field of Classification Search .............. 340/572.8, 340/572.7, 693.1, 693.3; 370/311, 503, 507; 375/354; 455/127.5, 574, 343.2, 343.3
See application file for complete search history.

(56) References Cited

U.S. PATENT DOCUMENTS

| | | | |
|---|---|---|---|
| 5,428,638 A * | 6/1995 | Cioffi et al. .................. | 455/522 |
| 5,528,222 A * | 6/1996 | Moskowitz et al. ....... | 340/572.7 |
| 5,567,537 A | 10/1996 | Yoshizawa et al. | |
| 6,002,708 A | 12/1999 | Fleming et al. | |
| 6,087,996 A | 7/2000 | Dery | |

(Continued)

FOREIGN PATENT DOCUMENTS

| | | |
|---|---|---|
| WO | 2003/00358 | 11/2003 |
| WO | 2003/098528 | 11/2003 |
| WO | 2005/00506 | 11/2005 |

OTHER PUBLICATIONS

"Bandwidth Enhancement and Size Reduction of Microstrip Slot Antennas" IEEE Trans. Antennas and Propagation, vol. 53, No. 3, Mar. 2005 pp. 994-104.
Choi, J.K. Park. S.K. Kim and J.Y. Park, "A New Ultra-Wideband Antenna for UWB Applications".

*Primary Examiner*—Thomas J Mullen
(74) *Attorney, Agent, or Firm*—Mark M. Friedman (57) ABSTRACT

An active radio frequency identification (REID) tag implemented on a flat label. The tag includes a battery printed on the label, a flat wide-band antenna printed on the label and a wide band communication circuit implemented as a chip inlay inside the label. The circuit is attached to the battery and to the antenna. The combined thickness of the battery, the antenna and the circuit as printed on the flexible label is less than one millimeter. The battery, the antenna and the circuit are printed on the label so as to render substantial flexibility to the RFID tag. The circuit operates at a center frequency of at least one gigahertz and a bandwidth at least twenty percent of said center frequency or a bandwidth at least 500 Mhz. The tag typically includes an inaccurate clock source such as an RC circuit and does not include a crystal. Average power consumption of the battery is preferably reduced by operating the tag with a low duty ratio between an active and an inactive interval; and during the active interval transmitting in bursts while turning off parts of the tag between the bursts. The communications circuit performs timing measurements on incoming received waveforms and transmits transmit signals in response to the received waveforms with timing based on the timing measurements. The receiver circuitry locks on a repetition frequency of the incoming received waveforms, and based on the repetition frequency generates a pulse repetition frequency of the transmit signals.

25 Claims, 7 Drawing Sheets

U.S. PATENT DOCUMENTS

| | | |
|---|---|---|
| 6,107,920 A | 8/2000 | Eberhardt et al. |
| 6,206,292 B1 | 3/2001 | Robertz et al. |
| 6,593,845 B1 * | 7/2003 | Friedman et al. ......... 340/10.33 |
| 6,700,491 B2 | 3/2004 | Shafer |
| 6,888,509 B2 | 5/2005 | Atherton |
| 6,914,562 B2 | 7/2005 | Forster |
| 6,914,573 B1 | 7/2005 | McCorkle |
| 6,940,408 B2 | 9/2005 | Ferguson et al. |
| 6,951,596 B2 | 10/2005 | Green et al. |
| 2002/0192542 A1 | 12/2002 | Luski et al. |
| 2003/0179078 A1 * | 9/2003 | Chen et al. .................. 340/10.2 |
| 2004/0200061 A1 | 10/2004 | Coleman et al. |
| 2005/0239917 A1 | 10/2005 | Nelson et al. |
| 2006/0001525 A1 * | 1/2006 | Nitzan et al. ................ 340/10.1 |
| 2006/0121851 A1 * | 6/2006 | Moore et al. ................ 455/41.2 |

* cited by examiner

FIG. 1

PRIOR ART

FIG. 2

PRIOR ART

WIDE BAND RFID SYSTEM WITH TAG ON FLEXIBLE LABEL

FIELD AND BACKGROUND OF THE INVENTION

The present invention relates to Radio Frequency identification (REID) systems and, more particularly, to a thin RFID tag which is printed on a thin flexible label and to methods of communicating with a thin REID tag.

Radio Frequency identification (REID) is a method of storing and remotely retrieving data using devices called REID tags. An RFID tag is a small object that can be attached to a product, animal, or person. REID tags receive and respond to radio-frequency queries from an REID reader. REID tags can be either active or passive. Passive tags operate by backscattering RF power and do not require an internal power source. Active RFID tags have an internal power source, e.g. battery, and typically have longer range and larger memories than passive tags. An active tag does not use backscattering of incident RF but includes a transmitter which transmits an RE signal to the reader. Active tags have numerous advantages over passive tags, however the cost of active tags is substantially higher.

An active tag, often used for real time location systems, includes an RE transmitter without a receiver and the active tag is programmed to transmit a tag identifier (ID) and optionally other pre-assigned or sensory data periodically at predetermined times. A more advanced type of active tag includes both receive and transmit circuitry which allow for both reading and writing data to the tag. A query is received by the mobile tag and the tag responds with data. The data is received by the REID reader and processed according to the needs of a particular application. The data transmitted by the tag may provide identification or location information, or specifics about the product tagged, such as price, color, date of purchase and other parameters.

The present invention utilizes in some embodiments inlaying of circuits and antenna in flexible materials to form an RFID label. Some examples of RFID tags and labels appear in U.S. Pat. Nos. 6,107,920, 6,206,292, and 6,951,596, all of which this application incorporates by reference for all purposes as if fully set forth herein.

Ultra-Wideband (UWB) communication, as approved by the US Federal Communications Commission (FCC) in February 2002, is a candidate for active tag RFID communication. Systems employing UWB typically employ an "impulse radio" or other wide-band methods for communicating the data, using low power transmission at RE frequencies between 3.1 Ghz to 10.6 Ghz, with bandwidth of at least 20% of the center frequency or at least 500 Mhz. An RFID system which includes a tag with ultra-wide band transmit and receive circuitry has been disclosed for performing distance measurements (e.g. over tens of meters) between a tag and a reader and/or distance measurements between different tags. PCT International Patent Application Publication No. WO 2003/098528, (PCT Patent Application No. PCT/IL2003/00358), by an inventor of the present invention, entitled "Method and system for distance determination of RF tags" and application PCT/IL2005/00506 are incorporated by reference for all purposes as if fully set forth herein. PCT/IL2003/00358 discloses an RFID system having the capability of automatically identifying unknown tags by sending a broadcast interrogation wide-band message signal and receiving responses from many (preferably all) tags that receive the message signal.

U.S. Pat. No. 6,002,708 entitled "Spread spectrum localizer", which also discloses a method of distance determination by a wide-band system, is incorporated herein by reference for all purposes as if fully set forth herein.

Figure 2:
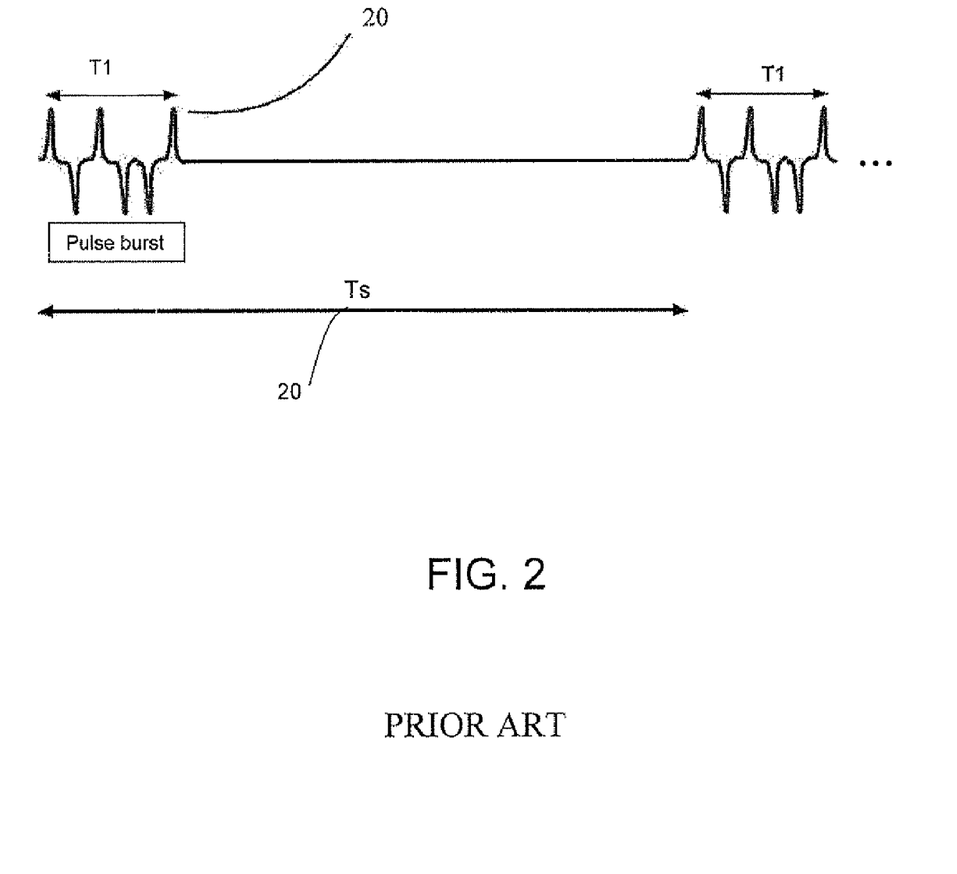
FIG. 2 is a prior art drawing of a simplified impulse radio transmission format.

Reference is now made to FIG. 2, which illustrates a prior art wide-band system transmission format as used PCT/IL03/00358. A transmission waveform is shown of short pulse bursts 20, or short pulse sequences 20. The total interval of bursts 20 is on the order of $T_1=100$ nanoseconds, with a nominal time separation of symbol time Ts 22 between bursts 20 typically between 1 microseconds and 30 microseconds. Waveforms 20 can be employed for impulse radio with low power consumption implementations. Some systems include a sequence of known symbols at the beginning or end of a set of data. The known sequence at the beginning or end is called a preamble or postamble, respectively. A typical packet 20 includes a relatively long preamble which consists of known pulse sequences with no data modulation imposed and after the preamble is a packet delimiter and data. A 'response' period (or postamble) follows the data, to accurately time the response.

Figure 1:
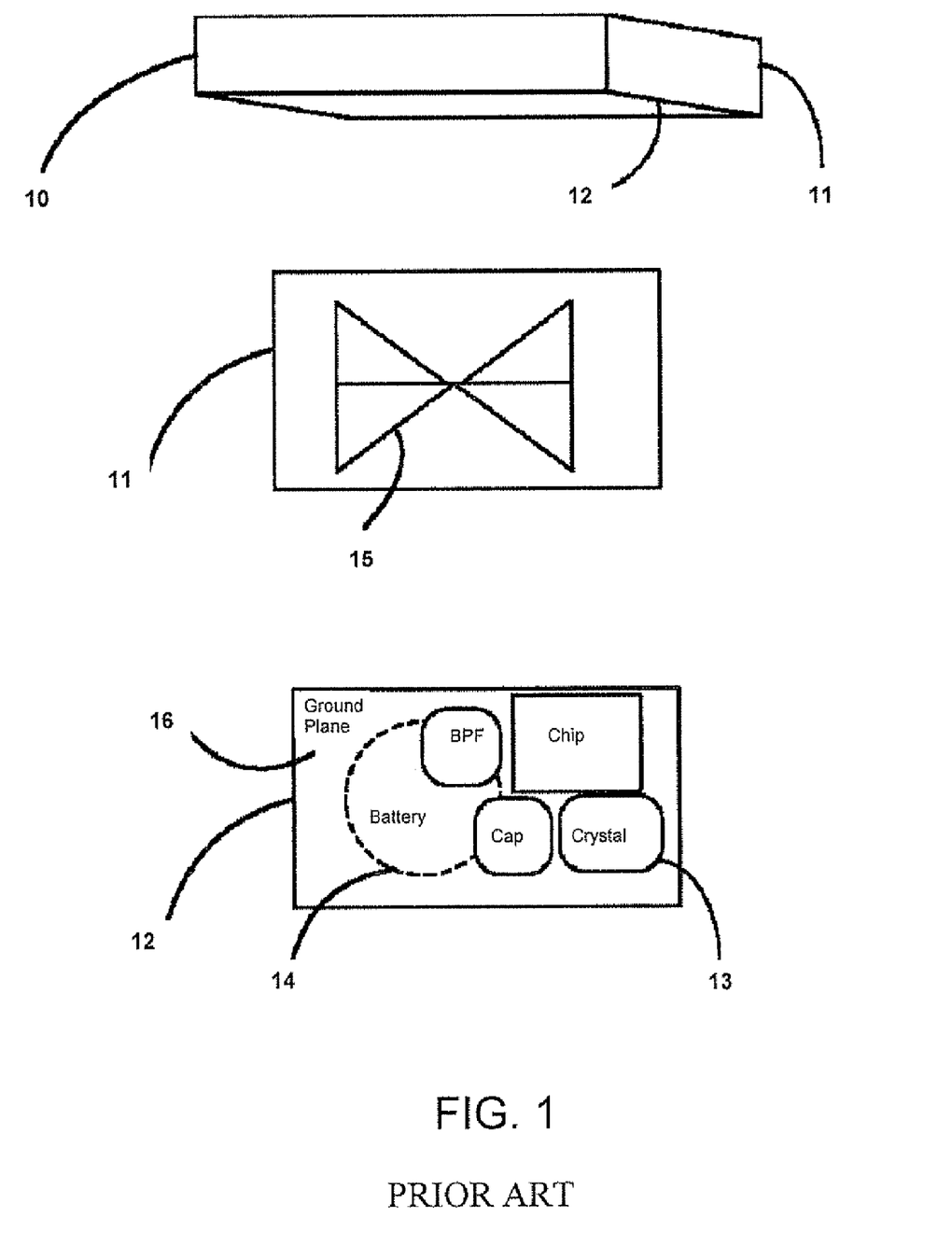
FIG. 1 is a prior art drawing of a wide-band RFID tag.

Reference is now made to FIG. 1, which illustrates a structure of a rigid-structured ultra wide band tag 10 of the prior art. UWB tag 10 is implemented on printed circuit boards 11 and 12. Antenna 15 is typically printed e.g. a bow-tie etched in PCB 11. Typically, a layer of first PCB 12 serves as a ground plane 16 of antenna 15 in order to achieve a wide bandwidth, as required in UWB communications, and reduced vulnerability to nearby materials. Ground plane 16 is separated by about a quarter wavelength ($\lambda/4$ where K is the RF wavelength) from the radiating part of antenna 15. The quarter wavelength is typically several mm, at radio frequencies of interest. Antenna 15, lithium coin battery 14, and crystal 13 lead to a thickness of tag 10 on the order of 1 centimeter. Tag 10 includes electronic circuitry, e.g. single communications chip, band-pass filter, crystal 13 and capacitor, all assembled on printed circuit board PCB 12. In some prior art tags 10, instead of a single chip, a communications circuit is implemented with several discrete parts. Crystal 13 is used as an accurate frequency reference to provide a clock source for timing and for generating the RF frequency of transmission and reception. A relatively large form factor, rigid structure and high base cost are among shortcomings of conventional UWB tags 10.

Smart active labels are thin (~1 mm) and flexible devices that include an integrated circuit and a power source printed on the label, without a crystal reference. Printed batteries are in commercial use from several companies e.g. Power Paper Ltd. (Petah Tikva, Israel) and Solicore Inc. (Lakeland, Fla. USA). Currently, printed batteries have a low capacity compared with lithium coin batteries. Capacity for printed batteries is typically 20 mAh per square inch. US patent publication 20020192542 assigned to Power Paper Ltd. entitled "Flexible thin layer electrochemical cell and manufacturing of same" as disclosed by S. Luski and Z. Nizan and patent application publication 20050239917 assigned to Solicore Inc. entitled, "Lithium inks and electrodes and batteries made therefrom" as disclosed by C. R. Nelson et al. are incorporated herein by reference for all purposes as if fully set forth herein.

Smart active labels use back-scattering to transmit data, in response to a query signal from a reader or 'interrogator'. In U.S. Pat. No. 6,888,509 entitled "Tamper indicating radio frequency identification label" disclosed by Atherton, a passive tag in the form of a label is described and a method is presented which alters the RFID signature if a label has been tampered. In US patent application 20040200061, entitled "Conductive pattern and method of making" disclosed by Coleman et al., a method is described for creating an electrically conductive pattern, applicable for producing an antenna on a label. In U.S. Pat. No. 6,700,491, entitled "Radio frequency identification tag with thin-film battery for antenna", a passive tag is disclosed with one arm of a thin-film battery serving as a dipole antenna. In U.S. Pat. No. 6,087,996, entitled "Thin-film antenna device for use with remote vehicle starting systems" as disclosed by Dery, includes a flat antenna which attaches to a car window with a simple connection to a receiver. In U.S. Pat. No. 5,567,537, entitled "Magnetic core element for antenna, thin-film antenna, and card equipped with thin-film antenna", a thin antenna is disclosed for thin PC cards with a low frequency range. In U.S. Pat. No. 6,940,408, "REID device and method of forming", a method is disclosed by Ferguson et al. which improves the connection of an RFID chip with a label antenna, and an RFID inlay which includes conductive bumps or traces that electrically couple by strapping leads to the antenna. U.S. Pat. No. 6,940,408 also references other prior art including methods of producing labels. In U.S. Pat. No. 6,914,562, entitled "RFID tag using a surface insensitive antenna structure", an RFID tag or label, as disclosed by I. J. Foster, is insensitive to or compensates for the substrate material of the tagged object. The antenna, according to U.S. Pat. No. 6,914,562, requires a ground plane of relatively large dimensions. In U.S. Pat. No. 6,914,573, "Electrically small planar UWB antenna apparatus and related system" McCorkle discloses a planar multi-layered wide band antenna that has a single-ended feed.

A thin and flexible UWB antenna may be produced. A representative reference in the area of UWB antennae include S. I. Latif, L. Shafai, and S. K. Sharina, "Bandwidth Enhancement and Size Reduction of Microstrip Slot Antennas", IEEE Trans. Antennas and Propagation, Vol. 53, No. 3, March 2005, pp. 994-1004. Another design based on a specific form of patch on a partial ground is found in Choi, J. K. Park, S. K. Kim, and J. Y. Park, "A New Ultra-Wideband Antenna for UWB Applications", Microwave and Optical Technology Letters, Vol. 40, No. 5, March 2004, pp. 399-402. IEEE Trans. Antennas and Propagation, Vol. 53, No. 3, March 2005, pp 994-1004 and Microwave and Optical Technology Letters, Vol. 40, No. 5, March 2004, pp. 399-402 are included herein by reference for all purposes as if fully set forth herein.

There is thus a need for, and it would be highly advantageous to have an active tag with a small form factor which may be printed on a flexible label and in particular a method for UWB communications with a small form factor which does not require a crystal for a clock and frequency source. A crystal is not desired since the crystal can not be printed nor flexibly attached on a thin label.

SUMMARY OF THE INVENTION

The term "wide band" or "ultra-wide band" (UWB) as used herein is defined as a radio communications device, system and/or method in which a modulated fractional bandwidth of 20% or greater is used or a bandwidth of 500 MHz or more of radio spectrum. The terms "clock source" and "frequency source" are used herein interchangeably.

According to the present invention there is provided an active radio frequency identification (RFID) tag implemented as a flat label. The tag includes a battery printed on the label, a flat antenna printed on the label and a communication circuit implemented in a chip inlay. The circuit is attached to the battery and to the antenna. Preferably, the combined thickness of the battery, the antenna and the circuit as printed on the label is less than one millimeter. Preferably the circuit operates at a center frequency of at least 1 gigahertz and a bandwidth at least twenty percent of said center frequency or a bandwidth at least 500 Mhz. Preferably, the battery, the antenna and the circuit are printed on the label so as to render substantial flexibility to the RFID tag. Preferably, the communications circuit includes receiver and transmitter circuitry. Preferably, the tag further includes an inaccurate clock source attached to the circuit and the inaccurate clock source does not include an accurate clock source, e.g. a crystal. Preferably, the inaccurate clock source is based on the charging time of a capacitor, and typically includes a capacitor and a resistor. Preferably, average power consumption of the battery is reduced by operating the tag with a low duty ratio between an active and an inactive interval; and during the active interval communicating (i.e. transmitting and/or receiving) in bursts while turning off at least a portion of the tag for at least a portion of an interval between the bursts. Preferably, the communications circuit includes receiver and transmitter circuitry, and the tag further includes an inaccurate clock source operatively attached to the communications circuit, and the communications circuit performs timing measurements on incoming received waveforms and transmits transmit signals in response to the received waveforms with timing based on the timing measurements. Preferably, the receiver circuitry locks on a repetition frequency of the incoming received waveforms, and based on the repetition frequency generates a pulse repetition frequency of the transmit signals. Preferably, the circuit includes a transceiver circuit, such as an ultra-wide band transceiver circuit and the transceiver circuit includes an inaccurate frequency reference and not an accurate frequency reference, e.g. crystal, wherein the transceiver circuit estimates a received center frequency of a received waveform and based on the received center frequency the transceiver circuit transmits an ultra wide band pulsed waveform with a locked transmit center frequency based on the received center frequency.

According to the present invention, there is provided a method of communicating in a communication system. The system includes one or more readers and a multiple tags printed on a label; and the tag includes solely an inaccurate clock source. In the method the tag transmits a transmission based on an inaccurate clock source; and the reader receives the transmission. The reader synchronizes on a center frequency and a pulse repetition frequency of the transmission, and based on the synchronized frequencies, the reader attempts to demodulate data included in the transmission. Preferably the transmission is a wide band transmission. Preferably, the method further includes operating the tag with a low duty ratio between an active and an inactive interval, and during the active interval, the tag communicates in bursts while turning off portions of the tag between the bursts.

Preferably, the reader, upon the synchronization, compensates for the inaccurate clock source and sends a message to the tag including a result based on the compensation. The tag retransmits another transmission based on received message, thereby improving tag synchronization. Preferably, the tag corrects center frequency and timing of the retransmission and further data exchange between the tag and the reader is based on the corrected center frequency and timing. Preferably, in one or more of the said packet exchanges, the reader first transmits a first ultra-wide-band transmission, and the tag transmission is in response to the first transmission of the reader and a time delay is measured between the first ultra-wide-band transmission and the reception of the tag transmission to determining the distance from the reader to the tag. Preferably, the first reader ultra-wide-band transmission includes a packet of multiple symbols, and the packet includes a preamble, data, and a postamble. A symbol includes a short pulse sequence followed by an inactive time period for the remainder of the symbol, and the first ultra-wide-band transmission has a duration of at least until receiving the tag transmission is complete.

According to the present invention there is provided a method which reduces average power consumption of a battery powering a communications device, wherein the battery and the device are printed on a label. The method includes operating the device with a low duty ratio between an active and an inactive interval; and during the active interval, communicating (transmitting and/or receiving) in bursts while turning off at least a portion of the device for at least a portion of an interval between the bursts.

According to the present invention there is provided, a communications system including a tag and a reader. The tag includes a battery printed on the label, a flat antenna printed on the label, and a communications circuit as an inlay on the label. The circuit is attached to the battery and to the antenna. The reader is in communication with the tag. When the reader synchronizes on a center frequency and a pulse repetition frequency of a transmission from the tag, the reader attempts to demodulate data included in the transmission. In the system, the tag includes an inaccurate frequency source (i.e. the tag does not include an accurate frequency source).

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method of ultra-wide band RFID communications. Specifically, the system includes an RFID tag implemented as a flexible label without an accurate timing or frequency source, e.g. a crystal, and the method of communications and the communications format used between the tag and the reader are appropriate and compensate for the absence of an accurate timing source incorporated into the tag.

The principles and operation of a system and method of RFID communications with a tag implemented as a thin label, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to enable mass deployment of UWB tags, in the form of a preferably flexible label, on paper or plastic material. A flexible label is easier to attach to items than rigid tags 10, and is produced at lower cost. Another intention of the present invention is to overcome design challenges in implementing a label UWB tag. The design challenges include developing a UWB protocol without an accurate timing source such as a crystal since the crystal cannot be printed nor placed on a thin flexible label. The overall circuit power consumption is constrained due to the very limited capacity of the printed battery and the antenna design is constrained to a very small thickness, and limited selection of materials. The antenna design has some known solutions, as were cited above. In a later paragraph, a novel power management method is described which allows to get an ultra-low average power consumption, which fits the limited capacity of a printed battery.

The present invention in different embodiments is applicable to ultra-wide band systems utilizing frequency bands below 1 gigahertz or above 3.1 gigahertz. Other embodiments of the present invention may be applied to the unlicensed 2.4 gigahertz band.

Embodiments of the present invention have advantages in manufacturing. Printing machines may be used which generate labels in rolls, attaching tools that allow users to conveniently detach a label from the roll and apply, e.g. using adhesive, on an item for tracking. Flexible labels can be adhered to varied forms, e.g. spherical shapes and varied materials such as plastics, or glass.

Figure 3:
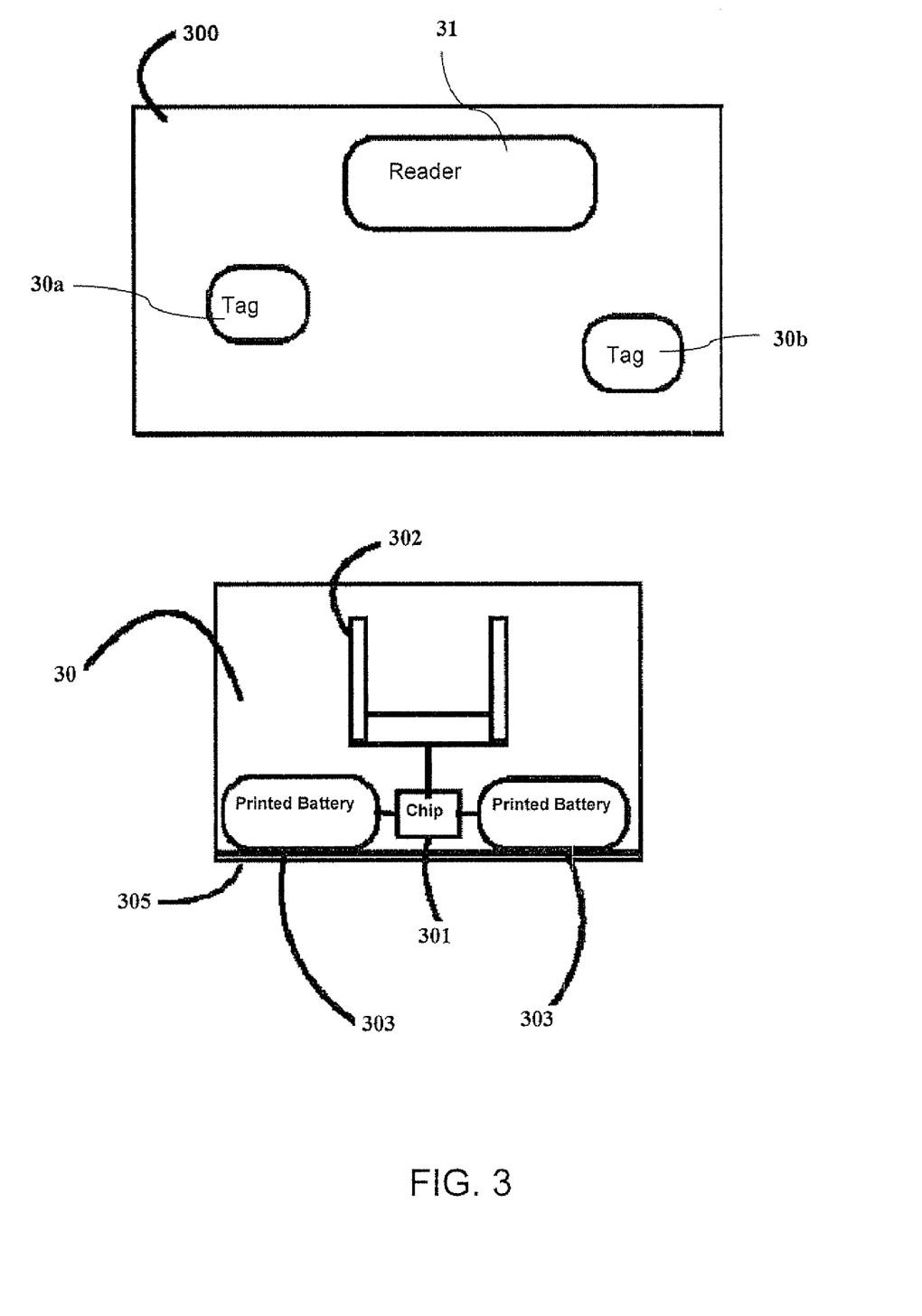
FIG. 3 is a drawing illustrating an embodiment of a wide-band label tag, according to the present invention.

Reference is now made to FIG. 3 which illustrates a system 300 including a reader 31 and a preferred embodiment of a wide-band label tag 30, according to the embodiments of the present invention. Label tag 30 includes a bare chip 301 inlay, printed antenna 302 and printed battery 303. Antenna 302 is based on a patch or a slot, above a ground plane 305 printed on the bottom side of label tag 30. Design of antenna 302 is based on known designs, with a bandwidth exceeding 500 Mhz (and typically even more than 1.5 Ghz). Overall thickness of the label tag 30 is about 1 mm.

Figure 4:
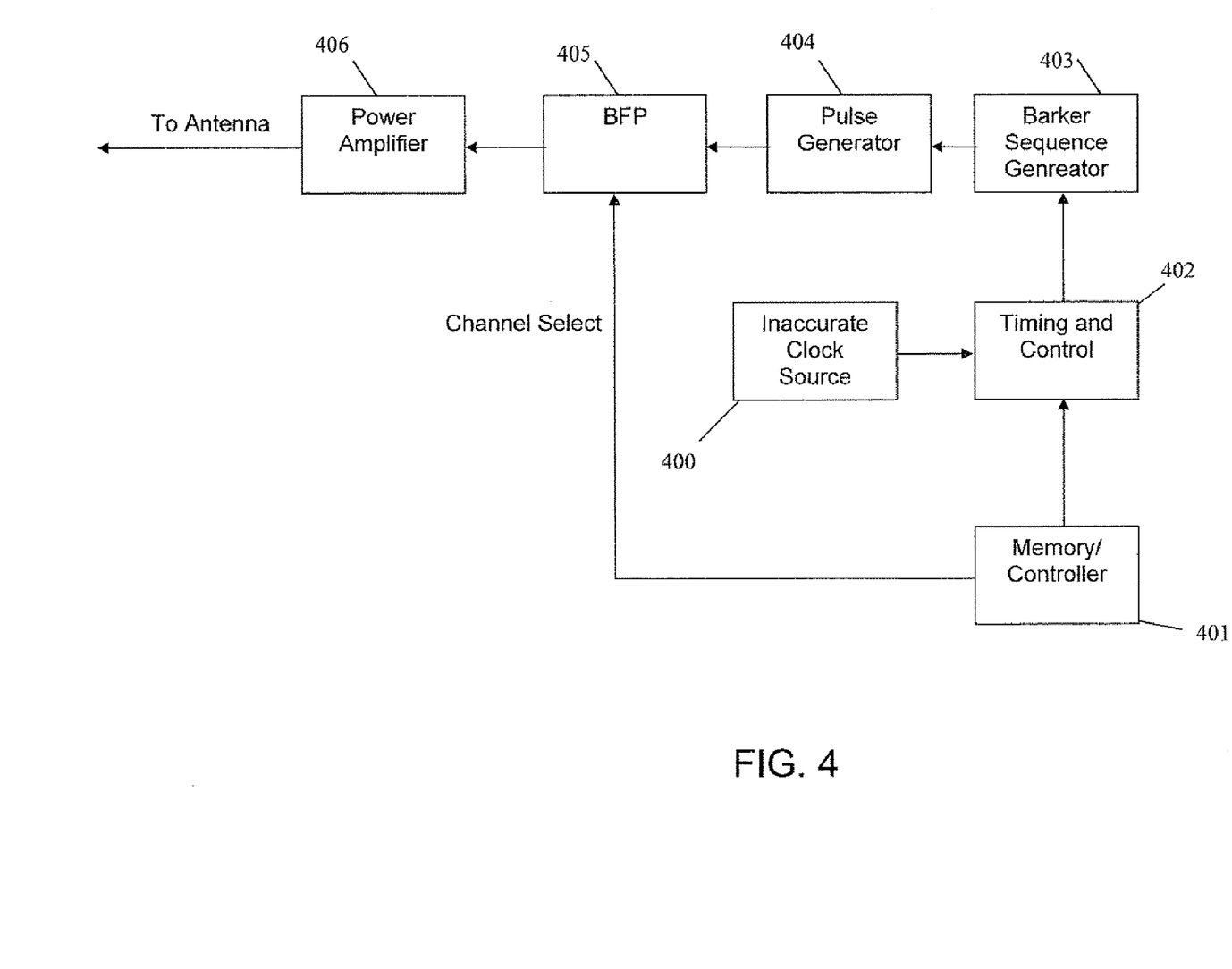
FIG. 4 is a block diagram depicting an embodiment of a transmit-only UWB label tag, according to the present invention.

In one embodiment of active label tag 30, according to the present invention, active label tag 30 includes in wide-band communications circuit 301 only transmitter circuitry, without wide band receiver circuitry, and an identification packet is transmitted periodically by label tag 30. Reference now is made also to FIG. 4 which illustrates a block diagram of wide-band communications circuit 301 which includes only transmitter circuitry without receiver circuitry. Label tag 30 includes an inaccurate clock source 400 typically including a resistor-capacitor (RC) oscillator and preferably implemented on chip 301 without additional discrete parts. Inaccurate clock source 400 functions to generate timing signals but with a relatively low accuracy. Inaccurate clock source 400 preferably does not require expensive or large components such as inductors, ceramic resonators or other types of resonators. Such a circuit may require off-chip resistors and/or capacitors. Preferably, all components of inaccurate clock source 400 include all resistors and capacitors "on-chip" to reduce assembly requirements. Temperature variations, for instance cause about a 1% variation of the oscillator frequency. Preferably, a calibration is performed e.g. during production of circuit 301 which reduces the inaccuracies.

Such an "all silicon" oscillator is known in the art (for example, DS1086 of Dallas Semiconductor Corp. Dallas, Tex. 75244 USA). A controller 401 includes memory to store a tag identification (ID) number and possibly other internal parameters such as the period between transmissions of the ID and the center frequency of transmission. Controller 401 feeds the data to timing circuitry 402 which includes a high-frequency oscillator and controls the timing of the transmission and modulation. The modulation method preferably uses pulse position modulation (PPM). The actual transmission format is generated by timing circuitry 402 in conjunction with a short Barker sequence generator module 403 and pulser 404 which feed a programmable band-pass filter 405 for limiting the spectrum of transmission or an up-conversion circuit 405, Filter or up-conversion circuit 405 finally feeds an output amplifier 406 to obtain the required peak power, and output amplifier 406 is connected to label antenna 302. Controller 401 also feeds the center frequency or channel of transmission to timing circuitry 402 and to programmable BPF/up-conversion circuit 405.

Communication in the presence of an inaccurate clock source, as may be appreciated by those skilled in the communications field, requires an analysis of the degradation in system performance caused by center frequency error and timing errors due to the inaccurate clock source 400. According to method embodiments of the present invention, ultra wide-band communications operate sufficiently well with the center frequency and timing errors resulting from inaccurate clock source 400. In comparison, if a narrow-band signal would have been employed, such as in channelized communication methods, e.g. IEEE 802.11, reception would be severely impaired, and actually a wide band channel would be needed in order to successfully communicate. Considering for example a 20 Mhz. signal at a RF center frequency of 4 Ghz., with an frequency error of up to 1%=40 Mhz., then transmission is outside the intended channel. Operating under the "UWB regime", there is no problem with a shift of center frequency by tens of Mhz. Moreover, for a 500 Mhz. wide signal, as used in UWB, the degradation resulting from a frequency error on the order of 1% of the center frequency is relatively small if the receiver employs no coherent detection. However the non-coherent detecting receiver will suffer in performance relative to a coherent or semi-coherent detecting receiver. In an RFID system 10 including an RFID reader 31 according to embodiments of the present invention, in order to improve performance, the receiver of reader 31 preferably estimates the center frequency of the incoming succession of pulses (transmitted by label tag 30). Preferably, the estimation is performed using a fast Fourier transform by sampling incoming pulses received from label tag 30 or other known techniques. In embodiments of the present invention, transceiver circuit 301 includes an inaccurate frequency reference or clock 400 and the timing of the transceiver and the center frequency are based on inaccurate clock source 400, thus the frequency error and timing are correlated. Circuit 301 estimates a received center frequency of a received waveform, and based on the estimate, circuit 301 adapts timing acquisition circuit for a better acquisition performance. Regarding the timing error and referring again to FIG. 2, the receiver of reader 31 expects nominally to receive pulse train 20 with a repetition time of Ts (symbol time), and transmitted pulse train 20 actually has a repetition time of (Ts±1%). For a Ts=1 microsecond, if transmitter clock 400 differs by 1% from a nominal value, than each pulse train 20 is 'shifted' by 10 nanoseconds relative to the timing of previous pulse train 20. Thus the receiver timing circuitry (of reader 31) has to employ a fast timing acquisition algorithm, which identifies the existence of UWB energy over one or a few pulses of pulse train 20, then reader 31 receiver acquires the timing, and then tracks the timing precisely of pulse train 20 transmitted by label tag 30. However, a relatively long preamble transmitted (by label tag 30) is preferred in order to allow receiver of reader 31 to properly and accurately track and time the incoming waveform.

Current consumption of label tag 30 is reduced by careful design and by a two-dimensional power reduction technique, as described later. Label tag 30 operates for an appreciable period, say several months (or more) with printed battery 303.

Figure 5:
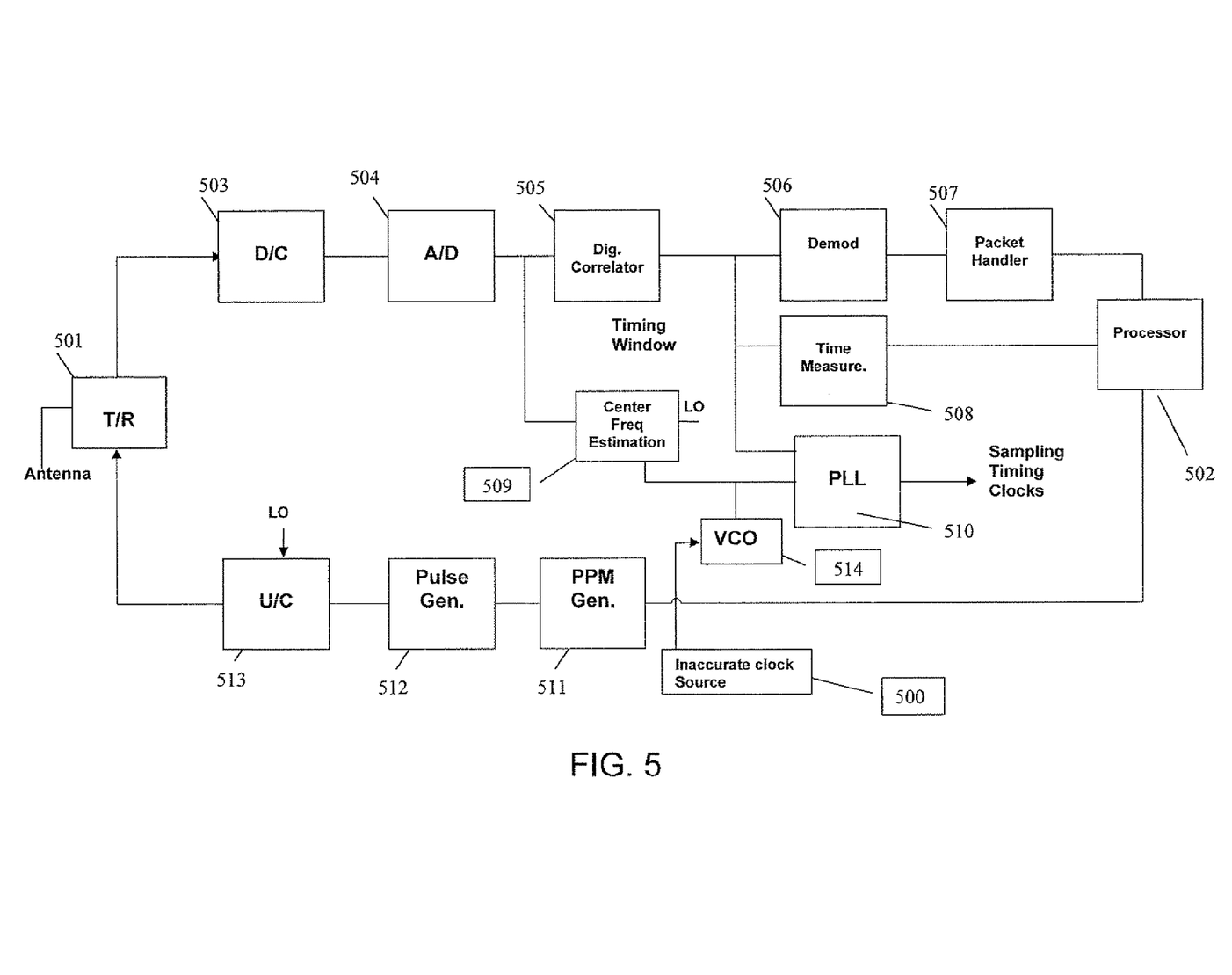
FIG. 5 is a block diagram, depicting an embodiment of a UWB label tag with transceiver capability according to the present invention.

Reference is now made to FIG. 5, a block diagram of an embodiment of label tag 30 including both transmitter and receiver, i.e. transceiver circuitry. FIG. 5 presents a block diagram of communication chip 301 of a wide-band transceiver label tag 30 having no crystal. Both receiver and transmitter circuits are tied to inaccurate clock source 500 of label tag 30. According to embodiments of the present invention efficient UWB duplex communication, and range between reader 31 and label tag 30 is determined, under the constraint of having only inaccurate clock source 500. Label tag 30 either transmits or receives, and thus pulse sequence 20 has preferably the same center frequency as pulse transmission of the embodiment of FIG. 4. A transmit/receive (T/R) switch 501, connected to antenna 302, is controlled by a tag chip processor 502. The receive chain includes a programmable down-converter 503, a fast analog to digital (A/D) converter 504, followed by a digital correlator 505 with Barker or other short sequence of pulses per symbol. Digital correlator 505 may also include a 'channel learning' circuit, which "learns" based on the preamble part of the received message. Demodulator 506 and a packet handler circuit 507, search for the packet delimiter which specifies the start of the data. The symbols of the data are routed to processor 502. Processor 502 analyzes the incoming symbols and generates a corresponding action and/or response. The receive chain may also include an estimator 508 of first time of arrival of the pulses for timing measurements. In order to align the frequency and timing of the tag, in the presence of local inaccurate clock source 400, a center frequency estimator 509 is employed, and a pulse timing estimator and/or a timing Phase Locked Loop (PLL) 510 acquire and track timing throughout during the reception period.

The transmission chain of FIG. 5 is similar to the transmission chain of embodiment of FIG. 4. A modulated waveform generator 511 is followed by wide-band pulse generator 512 and an up-converter to the chosen frequency 513. A high-frequency voltage controlled oscillator (VCO) 514 is locked to inaccurate clock source 500 of label tag 30. VCO 514 is connected to both the timing circuit 510 and the frequency lock circuit 509. When label tag 30 is in receive mode, label tag 30 searches for incoming pulse sequence 20, having a particular structure as transmitted by reader 31 of wide-band RFID system 10. In terms of power consumption, label tag 30 as a transceiver (FIG. 5) is preferably in sleep mode most of the time (more than 95%) to save power and the design of each sub circuit is strictly performed to save battery power.

Figure 6:
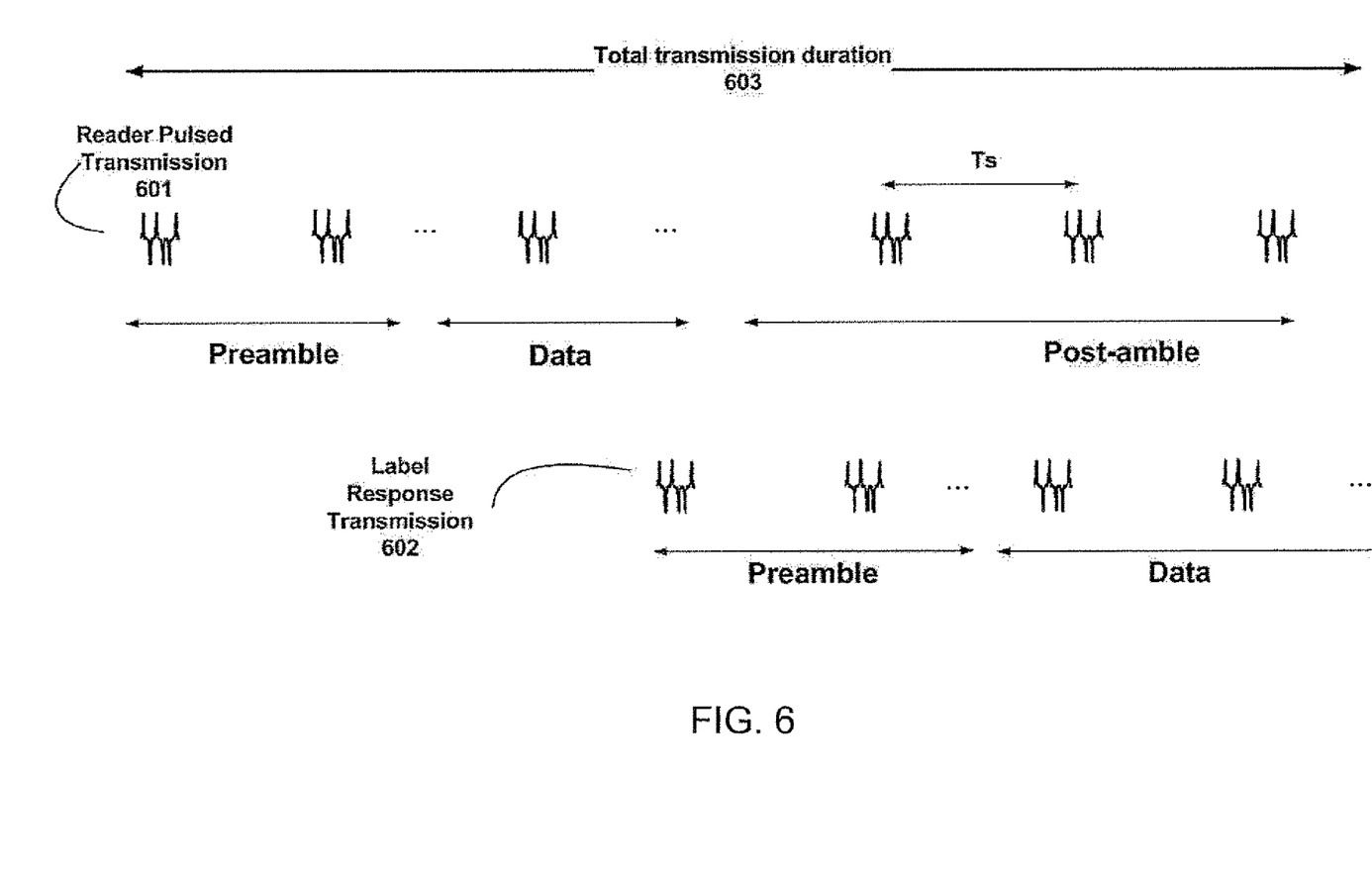
FIG. 6 is a drawing of a transmission and response format which is advantageous for a wide-band label with an inaccurate clock source, according to an embodiment of the present invention.

Reference is now made to FIG. 6 which illustrates schematically communications signals between reader 31 and label tag 30, according to a preferred embodiment of the present invention Reader 31 continues to transmit a pulsed sequence 601, until label tag 30 has completed transmission of tag response 602, for a total duration 603 which includes both reader pulsed transmission 601 to label tag 30 as well as label response transmission 602. As previously described, label tag 30 preferably includes power management which reduces average power consumption so that printed battery 14 can supply power for a considerable period, e.g. several months or more. With transmission waveform 601, then a very efficient receiver circuit may be designed, as some parts of the receiver may be turned off between successive pulsed sequences 20. The preamble part of reader pulsed transmission 601 is long enough so that the periodic search algorithm of label tag 30 can acquire and track waveform 20, with a high probability, even under low duty cycle of being active.

When label tag 30 is in receive mode, label tag 30 searches for incoming pulse sequence 601, having a particular structure transmitted by reader 31 of wide-band RFID system 10. Pulse sequence structure 601 is preferably similar to that described in PCT/IL03/00358, or another UWB format. Assume that any two-way communication between reader 31 and one or more label tags 30 starts with a query message transmitted by reader 31. Each time label tag 30 wakes up, label tag 30 searches in the time domain for a possible reception of pulse sequence 601. Once label tag 30 finds pulse sequence 601, label tag 30 locks on pulse sequence 601, preferably by locking on repetition frequency generated by reader 31, which has an accurate clock.

In parallel, label tag 30 receiver samples the complex phase of incoming waveform 601, e.g. once per incoming pulse, and in the estimated time window where the pulses occur, makes a frequency estimation, and uses a frequency locked loop to generate an improved estimate of the center frequency both for the receiver down-converter 503, and for transmitter up converter 513. Having roughly acquired the timing as well as correcting the center frequency, label tag 30 then generates a local accurate timing signal with a timing loop in a tracking mode, allowing the tag receiver to demodulate the incoming signal, and get the data.

For the task of initial acquisition, one may also note that as both time and frequency are tied to the same inaccurate source 500 in label tag 30, then the estimation problem is actually a one-dimensional uncertainty estimation problem that has inputs both in the time and frequency domains. One may invoke several possible 'epochs' in order to narrow down the uncertainty at label tag 30. As an example, consider the following five possibilities: label tag 30 clock leads by 1%, or 0.5%, or equal to reader 31 clock, or trailing by 0.5%, or trailing by 1%. Label tag 30 receiver can collect samples according to all these epochs, and choose the epoch with the largest probability (or largest metric); and finally, employ phase/frequency locked loops to track both the time and frequency of the incoming wave 601, starting from the chosen epoch which presumably reduces uncertainty from 2% total to 0.25%, in this example.

The data part in the received packet of transmission 601 typically contains one of several possible commands. In the case of a 'write' operation, label tag 30 has to write the incoming data to memory, but typically label tag 30 will also send back an acknowledge signal to reader 31. In case of 'ID inquiry' or 'data read' command, or in the case that the location of label tag 30 is sought, label tag 30 has to transmit data back to reader 31. The transmission from label tag 30 consists of a sequence of pulses 602, including un-modulated pulses in the preamble part, and modulated pulses with data, having the same repetition frequency as incoming pulses 601.

Pulsed sequence 602, transmitted by label tag 30, is demodulated by the UWB reader 31 receiver. Label tag 30 typically responds with a pseudo-random delay, a parameter preferably included in the received data. Use of pseudo-random delay is advantageous for reducing the probability of a collision with a response from another label tag 30, if a message from reader 31 is simultaneously addressed to more than one label tag 30.

Typically, it is advantageous that reader 31 maintains transmission of pulsed sequence 601 throughout the period in which active label tag 30 is responding, thus allowing label tag 30 to (continuously) get an 'accurate clock' over the communications link as well as a relatively good estimate of the center frequency for transmission. This results in a reduced degradation in the presence of inaccurate clock source on label tag 30, and allows improving the range of communication.

Another possibility for the initial handshake sequence is that label tag 30 wakes up, receives a beacon from reader 31. If there is a message or data pending for reader 31, label tag 30 transmits the pending data to reader 31. Alternatively, transmission of pending data may take place according to a previously determined schedule. Reader 31 acquires transmission 602 and responds to label tag 30 at the same center frequency. Reader 31 commands label tag 30 to correct tag transmission center frequency by 'k' Mhz, and then both reader 31 and label tag 30 continue to exchange messages with the same center frequency. In this way the burden of data acquisition in the presence of large frequency errors is taken by reader 31 simplifying implementation of label tag 30.

In embodiments of a transceiver label tag 30 with an inaccurate clock source of the present invention, the use of a particular two-way format, wherein reader 31 does not cease to transmit its pulsed waveform 601 until label tag 30 has completed its response 602, allows label tag 30 to acquire, synchronize and track an accurate timing and frequency reference, from actual waveform of the reader transmission.

Figure 7:
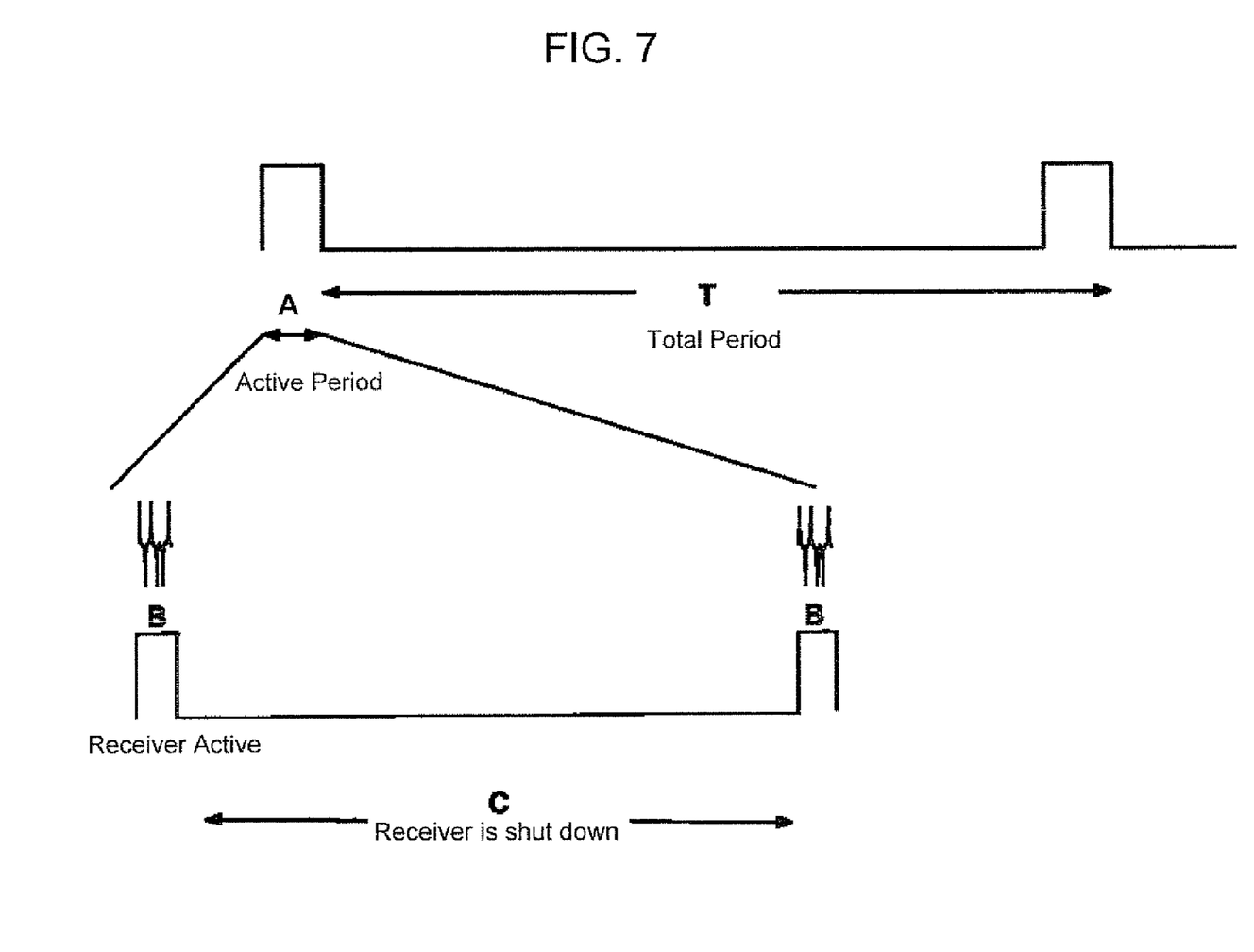
FIG. 7 is a drawing illustrating a power management scheme.

Reference is now made to FIG. 7, which illustrates a method of power management. First, label tag 30 is active preferably with a low duty cycle. For instance label tag 30 is active during period A, eg. 10 milliseconds out of a total period T e.g. 500 milliseconds. The duty cycle is consequently $\frac{1}{50}$. Second, many of the tag receiver (or transmitter) parts will be shut down during an interval C between consecutive received or transmitted symbols. For example, if burst length B per symbol is about 100 nanoseconds, and the symbol interval is 10 microseconds, then by activation of the receiver over only the short interval (or slightly longer, to compensate for clock drifts), a large factor, e.g. 80 to 100 of current reduction is achieved.

The use of these two mechanisms, allows achieving an ultra-low average power consumption. If the active power consumption is few tens of mA, and the total factor of power reduction is about $\frac{1}{10000}$ to $\frac{1}{5000}$, label tag 30 can have a life span of several months, with a 20 mAb printed battery.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. An active radio frequency identification (RFID) tag implemented as a flat label, the tag comprising:
   (a) a battery printed on the label;
   (b) a flat antenna printed on the label; and
   (c) a communications circuit as an inlay on the label, wherein said circuit is operatively attached to said battery and to said antenna said communications circuit including transmitter and receiver circuitry; and
   (d) an inaccurate clock source operatively attached to said communications circuit;
wherein said communications circuit performs timing measurements on incoming received waveforms and transmits transmit signals in response to said received waveforms with timing based on said timing measurements.

2. The tag, according to claim 1, wherein said communications circuit includes a wide-band communications circuit.

3. The tag, according to claim 1, wherein a combined thickness of said battery, said antenna and said circuit on the flat label is less than one millimeter.

4. The tag, according to claim 1, wherein said circuit operates at a bandwidth at least twenty percent of said center frequency.

5. The tag, according to claim 1 wherein said circuit operates at a center frequency of at least 1 gigahertz and a bandwidth of at least 500 Mhz.

6. The tag, according to claim 1, wherein said battery, said antenna and said circuit are printed on the flat label so as to render substantial flexibility to the RFID tag.

7. The tag, according to claim 1, wherein said inaccurate clock source does not include a crystal.

8. The tag, according to claim 1, wherein said inaccurate clock source is based on a combination of a resistor and a capacitor.

9. The tag, according to claim 1, wherein average power consumption of said battery is reduced by operating with a low duty ratio between an active and an inactive interval; and during said active interval said communications circuit communicates in bursts while turning off at least a portion of the tag for at least a portion of an interval between said bursts.

10. The tag, according to claim 1, wherein said receiver circuitry locks on a repetition frequency of said incoming received waveforms, and based on said repetition frequency generates a pulse repetition frequency of said transmit signals.

11. The tag, according to claim 1, wherein said circuit includes an ultra wide band transceiver circuit wherein said transceiver circuit includes an inaccurate frequency reference, wherein said transceiver circuit estimates a received center frequency of a received waveform and based on said received center frequency said transceiver circuit transmits an ultra wide band pulsed waveform with a locked transmit center frequency based on said received center frequency.

12. The tag, according to claim 1, wherein said circuit includes a transceiver circuit wherein said transceiver circuit includes an inaccurate frequency reference, wherein said transceiver circuit estimates a received center frequency of a received waveform and said transceiver circuit locks a timing of a transmitted signal based on said received center frequency.

13. The tag, according to claim 1, wherein said circuit does not include an accurate frequency source.

14. A method of communicating in a communication system, the system including a reader and a label tag whose components are inlayed on the label tag, wherein the label tag includes an inaccurate clock source, the method comprising the steps of:
   (a) transmitting by the label tag a transmission based on the inaccurate clock source;
   (b) receiving by the reader said transmission; and
   (c) the reader upon synchronizing on a center frequency and a pulse repetition frequency of said transmission, attempting to demodulate data included in said transmission.

15. The method, according to claim 14, wherein said transmission is a wide band transmission.

16. The method, according to claim 14, further comprising the steps of:
   (d) operating the tag with a low duty ratio between an active and an inactive interval, and
   (e) during said active interval, communicating in bursts while turning off at least a portion of the label tag for at least a portion of an interval between said bursts.

17. The method, according to claim 14, further comprising the steps of:
   (d) upon said synchronizing, compensating for the inaccurate clock source;
   (e) sending a message to the label tag including a result based on said compensating; and
   (f) retransmitting by the label tag another transmission based on said message, thereby improving synchronization of the label tag.

18. The method, according to claim 17, further comprising the steps of:
   (g) correcting by the label tag a center frequency and timing of said retransmitting; and
   (h) exchanging further data between the label tag and the reader based on said center frequency and said timing.

19. The method, according to claim 14, further comprising the step of, prior to said transmitting:
   (d) first transmitting by the reader a first ultra-wide-band transmission, wherein said transmitting by the label tag is in response to said first transmitting by the reader.

20. The method, according to claim 19, further comprising the step of:
   (e) measuring a time delay between said first ultra-wide-band transmission and said receiving thereby determining a distance to the label tag.

21. The method, according to claim 19, wherein said first ultra-wide-band transmission includes a packet including a plurality of symbols, wherein a format of said packet includes a preamble, data, and a postamble, wherein at least one said symbol includes a short pulse sequence followed by an inactive time period for the remainder of said symbol, wherein said first ultra-wide-band transmission has a duration at least until said receiving is complete.

22. A communications system comprising:
   (a) a label tag including a battery printed on said label tag, a flat antenna printed on said label tag, and a communications circuit as an inlay on said label tag, wherein said circuit is operatively attached to said battery and to said antenna;
   (b) a reader in communication with said label tag, wherein said reader, upon synchronizing on a center frequency and a pulse repetition frequency of a transmission from said label tag, attempts to demodulate data included in said transmission.

23. The system, according to claim 22, wherein said label tag further includes an inaccurate frequency source, and wherein said label tag does not include an accurate frequency source.

24. An active radio frequency identification (RFID) tag implemented as a flat label, the tag comprising:
 (a) a battery printed on the label;
 (b) a flat antenna printed on the label; and
 (e) a communications circuit as an inlay on the label, wherein said circuit is operatively attached to said battery and to said antenna;
  wherein said circuit includes an ultra wide band transceiver circuit said transceiver circuit including an inaccurate frequency reference, such that said transceiver circuit estimates a received center frequency of a received waveform and based on said received center frequency said transceiver circuit transmits an ultra wide band pulsed waveform with a locked transmit center frequency based on said received center frequency.

25. An active radio frequency identification (RFID) tag implemented as a flat label, the tag comprising:
 (a) a battery printed on the label;
 (b) a flat antenna printed on the label; and
 (c) a communications circuit as an inlay on the label, wherein said circuit is operatively attached to said battery and to said antenna;
wherein said circuit includes a transceiver circuit said transceiver circuit including an inaccurate frequency reference, such that said transceiver circuit estimates a received center frequency of a received waveform and said transceiver circuit locks a timing of a transmitted signal based on said received center frequency.

* * * * *

UNITED STATES PATENT AND TRADEMARK OFFICE
CERTIFICATE OF CORRECTION

PATENT NO. : 7,504,952 B2 Page 1 of 1
APPLICATION NO. : 11/318472
DATED : March 17, 2009
INVENTOR(S) : Gideon Kaplan et al.

It is certified that error appears in the above-identified patent and that said Letters Patent is hereby corrected as shown below:

Claim 24 column 13 should be corrected as follows:

Line 9: change
        --(e)--
        to
        "(c)"

Signed and Sealed this

Nineteenth Day of May, 2009

JOHN DOLL
*Acting Director of the United States Patent and Trademark Office*